(12) United States Patent
Yamashita

(10) Patent No.: US 8,351,517 B2
(45) Date of Patent: Jan. 8, 2013

(54) ELECTRONIC DEVICE

(75) Inventor: Makoto Yamashita, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 116 days.

(21) Appl. No.: 13/050,794

(22) Filed: Mar. 17, 2011

(65) Prior Publication Data

US 2011/0228862 A1    Sep. 22, 2011

(30) Foreign Application Priority Data

Mar. 17, 2010    (JP) ................................ 2010-061537

(51) Int. Cl.
*H04L 27/00* (2006.01)
(52) U.S. Cl. ......... 375/259; 375/222; 375/295; 375/316
(58) Field of Classification Search .................. 375/222, 375/259, 295, 316
See application file for complete search history.

(56) References Cited

U.S. PATENT DOCUMENTS

| | | | | |
|---|---|---|---|---|
| 5,652,866 | A | * | 7/1997 | Aldred et al. .................... 703/23 |
| 7,558,326 | B1 | * | 7/2009 | Lyle et al. ...................... 375/244 |
| 2002/0080886 | A1 | * | 6/2002 | Ptasinski et al. ............... 375/295 |
| 2008/0299908 | A1 | | 12/2008 | Tanada |

FOREIGN PATENT DOCUMENTS

| | | |
|---|---|---|
| JP | 08-274758 A | 10/1996 |
| JP | 08-331153 A | 12/1996 |
| JP | 10-070490 A | 3/1998 |
| JP | 2002-261857 A | 9/2002 |
| JP | 2002-319925 A | 10/2002 |
| JP | 2004-072535 | 3/2004 |
| JP | 2005-223443 | 8/2005 |
| JP | 2005-294895 A | 10/2005 |
| JP | 2006-165689 A | 6/2006 |
| JP | 2006-197062 A | 7/2006 |
| JP | 2008-300954 | 12/2008 |
| JP | 2008-547362 A | 12/2008 |

OTHER PUBLICATIONS

Notification of Reasons for Rejection mailed by Japan Patent Office on May 31, 2011 in the corresponding Japanese patent application No. 2010-061537.
Final Notice of Rejection mailed by Japan Patent Office on Aug. 23, 2011 in the corresponding Japanese patent application No. 2010-061537.
Suzuye & Suzuye, Information Sheet for preparing an Information Disclosure Statement, undated, in 1 page.

* cited by examiner

*Primary Examiner* — Ted Wang
(74) *Attorney, Agent, or Firm* — Knobbe, Martens, Olson & Bear, LLP

(57) ABSTRACT

According to one embodiment, a communication unit is configured to wirelessly transmit and receive signals via at least one of a first physical link and a second physical link. A power consumption for wireless transmission and reception of the signals via the first physical link is lower than that a power consumption for wireless transmission and reception of the signals via the second physical link. A first link control module establishes the first physical link between the communication unit and an external device. A remote control module transmits to the external device a playback request signal via the first physical link. A second link control module establishes the second physical link between the communication unit and the external device, after the playback request signal is transmitted. A data transfer module transfers the digital content data between the communication unit and the external device via the second physical link.

2 Claims, 5 Drawing Sheets

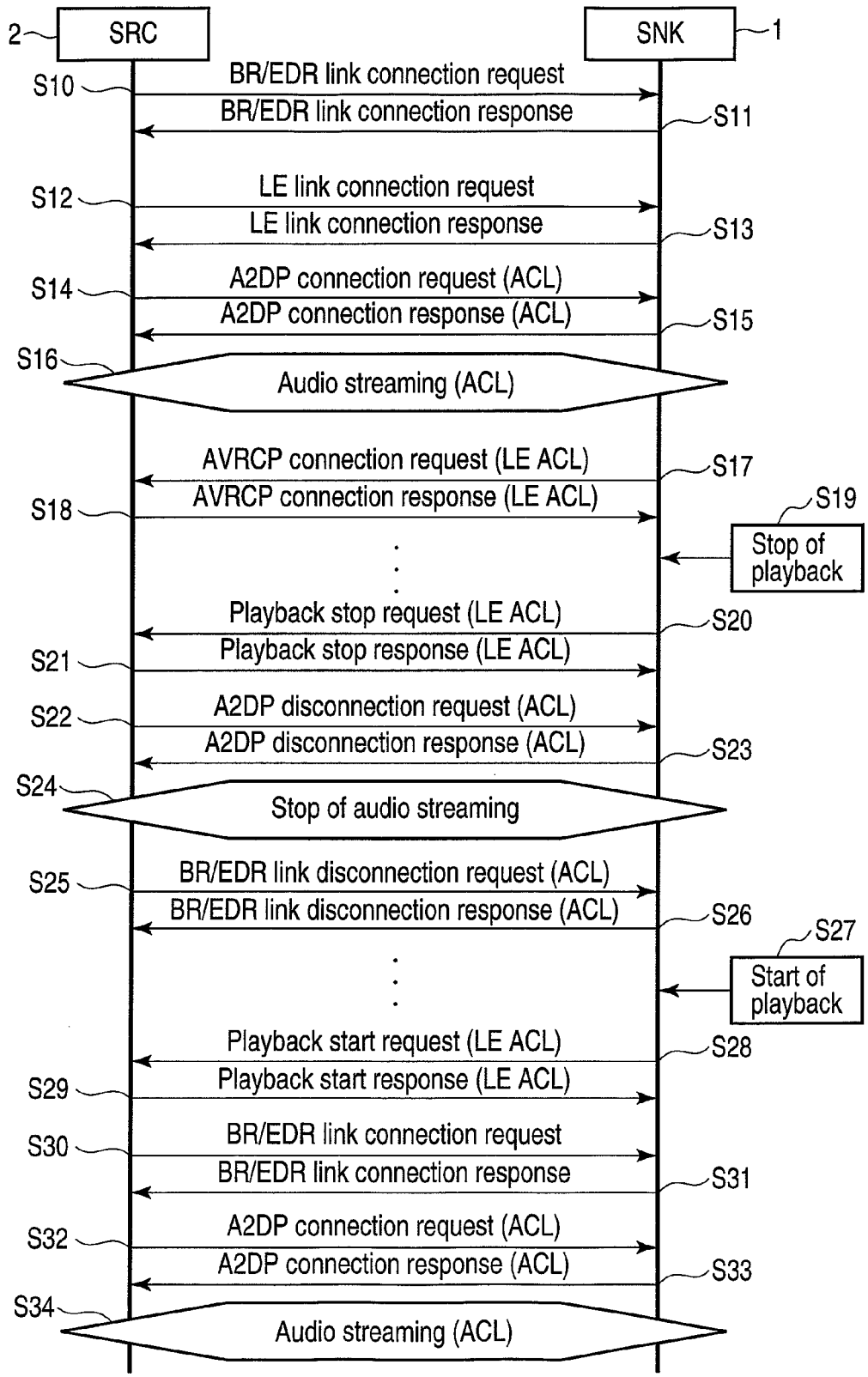
F I G. 3

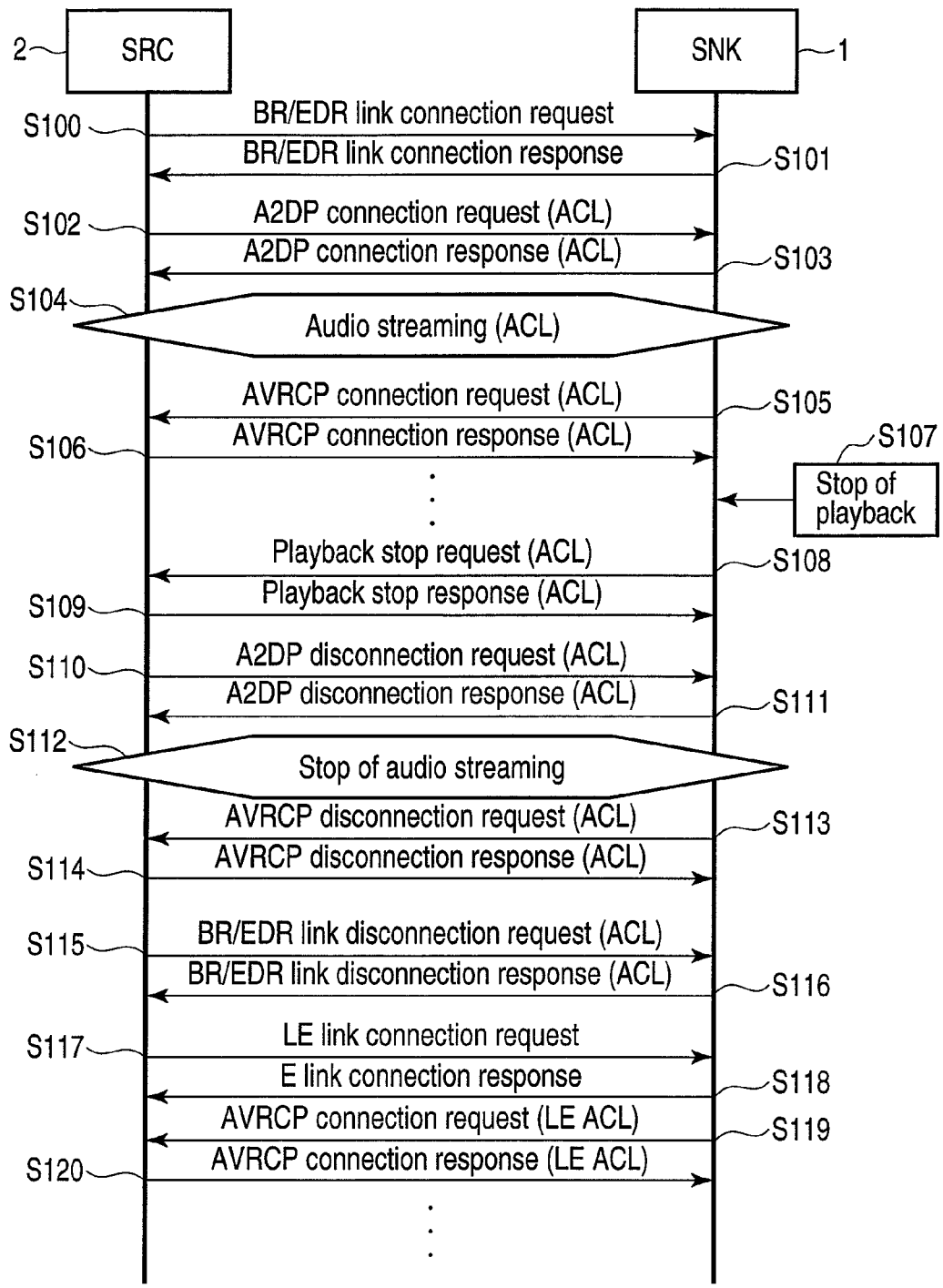
F I G. 5

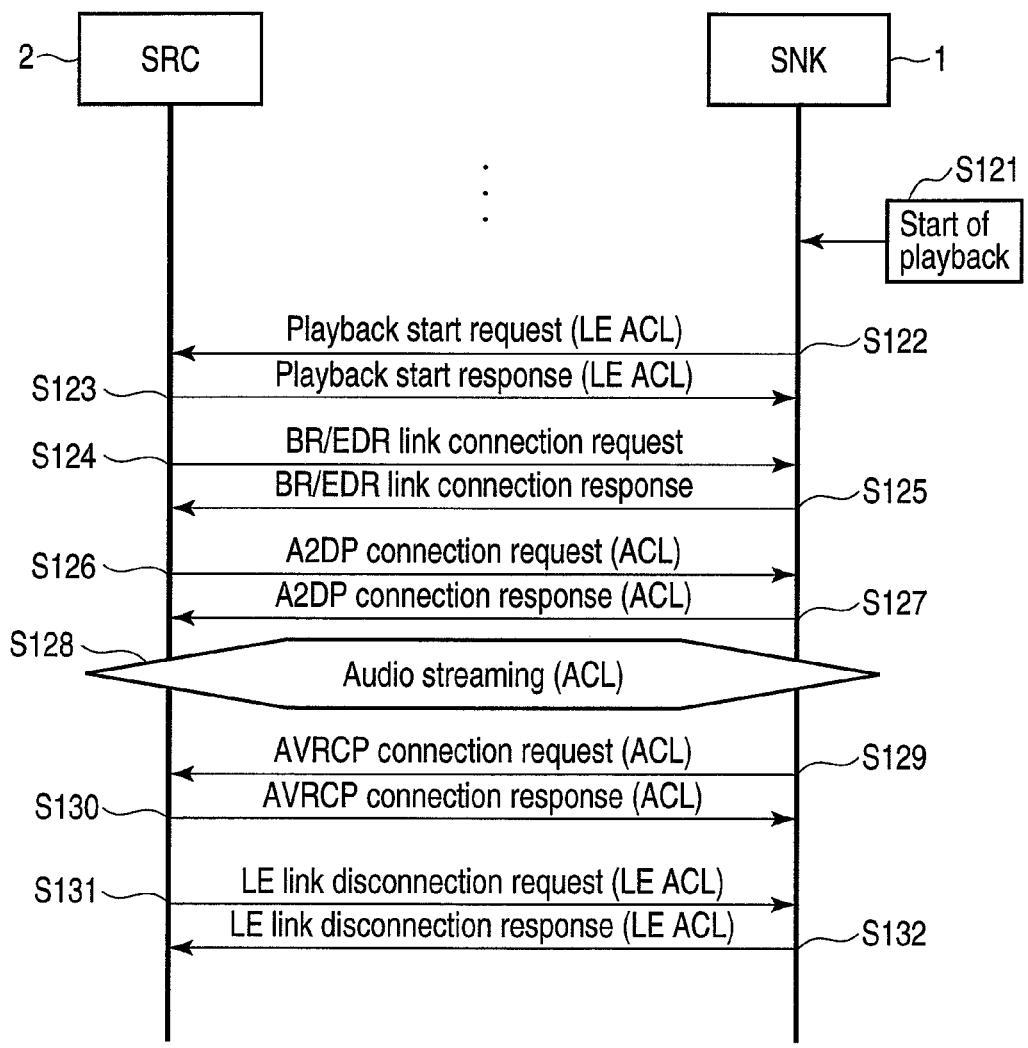
F I G. 6

ELECTRONIC DEVICE

CROSS-REFERENCE TO RELATED APPLICATIONS

This application is based upon and claims the benefit of priority from Japanese Patent Application No. 2010-061537, filed Mar. 17, 2010, the entire contents of which are incorporated herein by reference.

FIELD

Embodiments described herein relate generally to an electronic device having a wireless communication function.

BACKGROUND

In recent years, various wireless communication techniques have been developed with the aim of taking the place of cables that connect electronic devices. Examples of these wireless communication techniques include Bluetooth® or other various close proximity wireless communication systems.

In Bluetooth® Audio/video Remote Control Profile (AVRCP) is stipulated. The AVRCP is used in order to remote-control playback of content data (audio or video). The AVRCP can enhance the operability relating to playback of content data.

In the meantime, in general, portable devices, such as a music player and a wireless headset, require low cost and low power consumption.

Jpn. Pat. Appln. KOKAI Publication No. 2005-223443 discloses an apparatus which wirelessly transmits video/audio data. This apparatus includes a broad-band communication module which uses a band of 2.4 GHz or 5.2 GHz, and a narrow-band communication module which uses a band of 400 MHz or 1.2 GHz. The broad-band communication module is used in order to wirelessly transmit video/audio data. On the other hand, the narrow-band communication module is used in order to turn on/off the broad-band communication module.

In this apparatus, however, no consideration is given to the structure for executing remote control. Thus, there is a demand for realizing a novel technique for reducing power consumption for wireless communication, without degrading operability.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary diagram illustrating the procedure of a wireless communication operation which is executed between the electronic device according of the embodiment and the external device;

FIG. 5 is an exemplary diagram illustrating a part of the procedure of the wireless communication operation which is executed via the wireless connection illustrated in FIG. 4; and FIG. 6 is an exemplary diagram illustrating the other part of the procedure of the wireless communication operation which is executed via the wireless connection illustrated in FIG. 4.

DETAILED DESCRIPTION

Various embodiments will be described hereinafter with reference to the accompanying drawings.

In general, according to one embodiment, an electronic device comprises a communication unit, a first link control module, a remote control module, a second link control module, and a data transfer module. The communication unit is configured to wirelessly transmit and receive signals via at least one of a first physical link and a second physical link. A power consumption for wireless transmission and reception of the signals via the first physical link is lower than a power consumption for wireless transmission and reception of the signals via the second physical link. The first link control module is configured to establish the first physical link between the communication unit and an external device. The remote control module is configured to transmit to the external device a playback request signal for playback of digital content data via the first physical link. The second link control module is configured to establish the second physical link between the communication unit and the external device, after the playback request signal is transmitted. The data transfer module is configured to transfer the digital content data between the communication unit and the external device via the second physical link.

Figure 1:
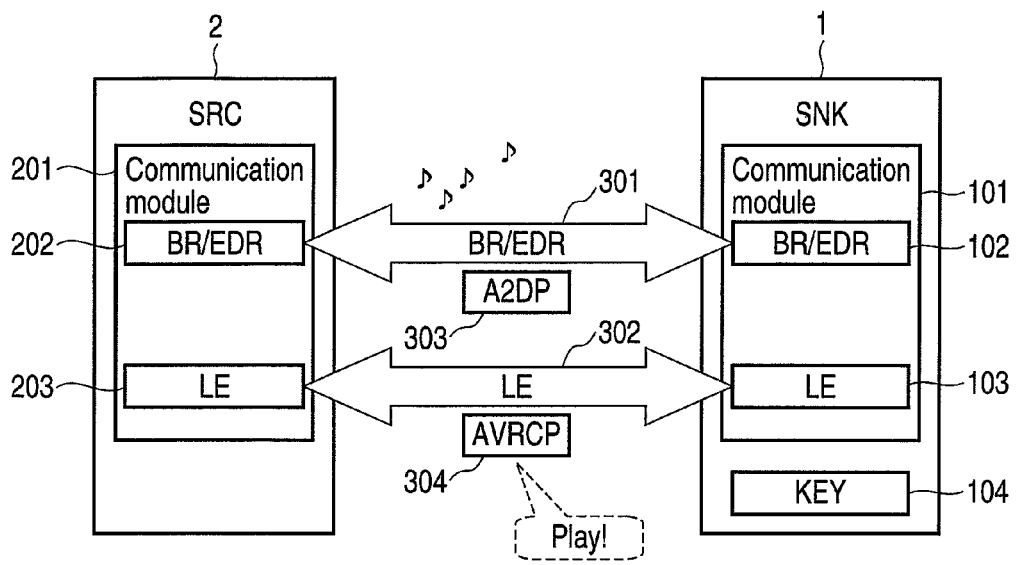
FIG. 1 is an exemplary block diagram illustrating a wireless connection between an electronic device according to an embodiment and an external device.

FIG. 1 illustrates an example of a wireless connection between two electronic devices. The wireless connection is realized by using a wireless communication technique that is provided by the electronic device according to the embodiment. This wireless connection is used, for example, in order to transfer digital content data between the two electronic devices, that is, in order to perform a streaming of digital content data. The digital content data is, for instance, audio data, video data, or other various media data. In this example, it is assumed that audio data is streamed via the wireless connection between the two electronic devices.

In FIG. 1, a sink device (SNK) 1 is an electronic device configured to wirelessly receive audio data. The sink device 1 may be, for instance, a wireless headphone, a wireless speaker, or other various wireless devices. A source device (SRC) 2 is an electronic device configured to wirelessly transmit audio data. The source device (SRC) 2 may be, for instance, an audio player, or other various wireless devices.

The SNK 1 comprises a communication module 101. The communication module 101 is a communication unit configured to execute wireless communication with a remote device (external device). The communication module 101 is configured to wirelessly transmit and receive signals via at least one of a first physical link and a second physical link. As described above, the power consumption for wireless transmission and reception of signals via the first physical link is lower than the power consumption for wireless transmission and reception of signals via the second physical link.

To be more specific, the communication module 101 is configured to be capable of supporting two base bands (physical layers) with different power consumptions, namely a first base band and a second base band. The physical link provided by the first base band is the above-described first physical link. The physical link provided by the second base band is the above-described second physical link. Each of the first physical link and second physical link may use a frequency band such as an ISM band. The data transmission rate (also referred to as "data rate") of the first physical link, which is provided by the first base band, is lower than the data transmission rate of the second physical link, which is provided by the second base band. On the other hand, the time necessary for establishing and disconnecting the first physical link is shorter than the time necessary for establishing and disconnecting the second physical link.

In order to support the two base bands, i.e. two physical links, the communication module 101 comprises two modules (two communication modules) 102 and 103. The module 102 is configured to establish the second physical link between a local device (SNK 1) and a remote device (SRC 2), and to wirelessly transmit and receive signals via the second physical link. The module 103 is configured to establish the first physical link, which is lower in power consumption and cost than the second physical link, between the local device (SNK 1) and the remote device (SRC 2), and to wirelessly transmit and receive signals via the first physical link.

Each of the two modules 102 and 103 uses the same communication system, for example, a wireless communication system using frequency hopping. In other words, the communication module 101 comprises the two modules 102 and 103 which use the same communication system, and the power consumptions of the two modules 102 and 103 are different.

The module 102 selectively uses an m-number of frequency channels which are obtained, for example, by dividing a frequency band, such as an ISM band, in units of 1 MHz. On the other hand, the module 103 selectively uses an n-number of frequency channels which are obtained, for example, by dividing a frequency band, such as an ISM band, in units of 2 MHz. In this case, n is less than m. Specifically, the wireless transmission and reception of signals via the second physical link are executed by frequency hopping which effects hopping between the m-number of frequency channels, and the wireless transmission and reception of signals via the first physical link are executed by frequency hopping which effects hopping between the n-number of frequency channels. In this manner, the module 103 executes hopping between a less number of frequency channels than the module 102. This is one of the reasons why the power consumption is lower in the module 103 than in the module 102.

The communication module 101 can be realized, for example, by a Bluetooth® module.

In this case, the module 102 may be realized as a BR/EDR module of Bluetooth®. The BR/EDR module is a wireless transmission/reception device corresponding to a basic rate (BR) or an enhanced data rate (EDR) of Bluetooth®. The BR/EDR module can execute communication at a maximum rate of about 2 to 3 Mbps. The BR/EDR module comprises a physical layer (base band), a link manager, and a host controller interface (HCI). On the other hand, the module 103 may be realized as an LE module which is a wireless transmission/reception device corresponding to Low Energy (LE) which has newly been stipulated as Version 4.0 of Bluetooth®. The LE module can execute communication at a maximum rate of about 1 Mbps. The LE module comprises a physical layer (base band), a link manager, and a host controller interface (HCI).

In the description below, the case is assumed in which the module 102 is realized as the BR/EDR module and the module 103 is realized as the LE module.

Each of the BR/EDR module and LE module can operate singly. In other words, the BR/EDR module of one device can wirelessly communicate with the BR/EDR module of the other device. In addition, the LE module of one device can wirelessly communicate with the LE module of the other device.

Thus, usually, in the wireless communication between devices, the BR/EDR module and LE module are exclusively used.

On the other hand, in the present embodiment, the wireless communication between the devices is executed by a combination of the communication between the BR/EDR modules and the communication between the LE modules. To be more specific, the SNK 1 establishes a first physical link (LE link) 302 between the communication module 101 and the SRC 2, and transmits a playback request signal for playback of digital content data (e.g. audio data) to the SRC 2 via the LE link 302. After transmitting the playback request signal, the SNK 1 establishes a second physical link (BR/EDR link) 301 between the communication module 101 and the SRC 2, and transfers digital content data between the communication module 101 and the SRC 2 via the second physical link (BR/EDR link) 301. Specifically, the SNK 1 receives digital content data from the SRC 2 via the BR/EDR link 301.

In this manner, in the embodiment, the BR/EDR link 301 (BR/EDR module) is used for transfer of content data between the devices, that is, for streaming. On the other hand, the LE link 302 (LE module) is used for remote control of the remote device, for example, playback and stop (including pause) of content data. This remote control is executed in accordance with the operation of a key 104 provided on the SNK 1. For example, one or more button switches may be used as the key 104.

The structure of the embodiment, which uses different physical links for streaming and remote control, makes it possible to remote-control the SRC 2 from the SNK 1 via the power-saved LE link 302, without using the BR/EDR link 301. Furthermore, by transmitting a playback start request signal from the SNK 1 to SRC 2 via the LE link 302, it becomes possible to establish the BR/EDR link 301 for streaming at an arbitrary timing, that is, to establish the BR/EDR link 301 only when necessary.

Accordingly, it is possible, for example, to first establish only the LE link 302 for remote control, and to establish, when streaming is started or resumed, the BR/EDR link 302 for streaming. Thus, for example, while the streaming is stopped (paused), it should suffice if only the LE link 302 is established, and it is possible to disconnect the BR/EDR link 302. Thereby, while the streaming is stopped (paused), the power, which is consumed by the wireless communication by the BR/EDR link 301, can be saved, or in other words, the standby power consumption can be reduced. Moreover, since the streaming data and audio remote-control data are transmitted and received via the different physical links, the speed of a request for audio remote-control and the speed of a response to the request can be increased, and the operability can be improved. Therefore, the power consumption for wireless communication can be reduced, without degrading the operability.

A communication module 201 of the SRC 2 also comprises a BR/EDR module 202 and an LE module 203. The BR/EDR module 202 has the same function as the above-described BR/EDR module 102 of the SNK 1. The LE module 203 has the same function as the above-described LE module 103 of the SNK 1.

In Bluetooth®, an A2DP (Advanced Audio Distribution Profile) is stipulated as a profile for audio streaming. In addition, in Bluetooth®, an AVRCP (Audio Video Remote Control Profile) is stipulated as a profile for remote control. In the present embodiment, an A2DP connection 303 for audio streaming is set up on the BR/EDR link 301 which is established between the BR/EDR modules 102 and 202. An AVRCP connection 304 for remote control is set up on the LE link 303 which is established between the LE modules 103 and 203.

In the above description, the case has been assumed in which the SNK 1 operates as the remote controller of AVRCP and the SRC 2 operates as the target of AVRCP. However, the SRC 2 may operate as the remote controller of AVRCP and the SNK 1 may operate as the target of AVRCP. The electronic device of the embodiment may be realized as the SNK 1 having the role of the remote controller, or as the SRC 2 having the role of the remote controller.

Figure 2:
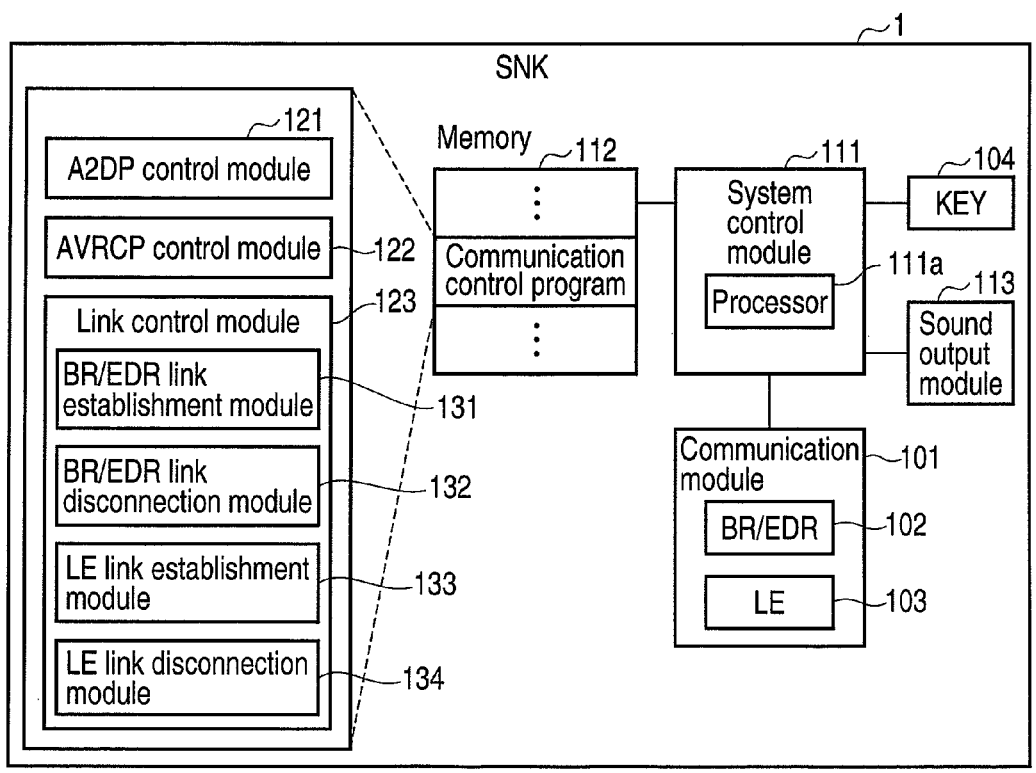
FIG. 2 is an exemplary block diagram illustrating a system structure example of the electronic device of the embodiment.

Next, referring to FIG. 2, a description is given of a system structure example of the electronic device, assuming the case where the electronic device of the embodiment is the SNK 1.

The SNK 1 comprises a system control module 111, a memory 112 and a sound output module 113, in addition to the above-described communication module 101 and key 104. The system control module 111 comprises a CPU 111a. The CPU 111a operates as a host of the communication module 101. The CPU 111a executes a communication control program which is stored in the memory 112. The communication control program comprises an A2DP control module 121, an AVRCP control module 122 and a link control module 123, as program modules for controlling the communication module 101.

The A2DP control module 121 establishes an A2DP connection between the devices, and executes transfer of audio data via the A2DP connection. The AVRCP control module 122 establishes an AVRCP connection between the devices, and transmits to the remote device a control signal for remote-controlling playback, etc. of digital content data. The link control module 123 comprises a first link control module for executing establishment and release (disconnection) of the LE link, and a second link control module for executing establishment and release (disconnection) of the BR/EDR link. The first link control module comprises an LE link establishment module 133 and an LE link disconnection module 134. The LE link establishment module 133 executes a procedure for establishing the LE link 302 between the LE modules 103 and 203. The LE link disconnection module 134 executes a procedure for disconnecting the established LE link 302. The second link control module comprises a BR/EDR link establishment module 131 and a BR/EDR link disconnection module 132. The BR/EDR link establishment module 131 executes a procedure for establishing the BR/EDR link 301 between the BR/EDR modules 102 and 202. The BR/EDR link disconnection module 132 executes a procedure for disconnecting the established BR/EDR link 301.

Next, referring to FIG. 3, the procedure of the communication process in the embodiment is described. FIG. 3 illustrates a sequence in the case where audio streaming is started, the audio streaming is stopped while the audio streaming is being executed, and then the audio streaming is resumed.

To start with, the SRC 2 wirelessly transmits a BR/EDR link connection request signal to the SNK 1 (S10). Responding to the reception of the BR/EDR link connection request signal from the SRC 2, the SNK 1 wirelessly transmits a BR/EDR link connection response signal to the SRC 2 (S11). Thereby, a BR/EDR link 301 is established between the BR/EDR module 102 of the SNK 1 and the BR/EDR module 202 of the SRC 2. The BR/EDR link 301 is realized, for example, by using an ACL (asynchronous link) of Bluetooth®. The ACL is an asynchronous (packet exchange) type physical link. In the meantime, the SNK 1 may wirelessly transmit the BR/EDR link connection request signal to the SRC 2.

Subsequently, the SRC 2 wirelessly transmits an LE link connection request signal to the SNK 1 (S12). Responding to the reception of the LE link connection request signal from the SRC 2, the SNK 1 wirelessly transmits an LE link connection response signal to the SRC 2 (S13). Thereby, an LE link 302 is established between the LE module 103 of the SNK 1 and the LE module 203 of the SRC 2. The LE link 302 is also realized by using the ACL of Bluetooth®. In the meantime, the SNK 1 may wirelessly transmit the LE link connection request signal to the SRC 2.

Then, the SRC 2 wirelessly transmits to the SNK 1 an A2DP connection request signal for setting an A2DP connection on the BR/EDR link 301 (S14). Responding to the reception of the A2DP connection request signal from the SRC 2, the SNK 1 wirelessly transmits an A2DP connection response signal to the SRC 2 (S15). Thereby, a streaming connection for executing transmission and reception of audio streaming data, that is, an A2DP connection, is established on the BR/EDR link 301, and the streaming and playback of audio data, for instance, music, are started (S16). In this case, the SRC 2 wirelessly transmits a stream of audio data via the BR/EDR link 301. While receiving the stream of audio data from the SRC 2 via the BR/EDR link 301, the SNK 1 decodes and plays back the received stream of audio data.

Thereafter, the SNK 1 wirelessly transmits to the SRC 2 an AVRCP connection request signal for setting an AVRCP connection on the LE link (LE ACL) 302 (S17). Responding to the reception of the AVRCP connection request signal from the SNK 1, the SRC 2 wirelessly transmits an AVRCP connection response signal to the SNK 1 (S18). Thereby, an AVRCP connection for executing transmission and reception of a command/response for audio remote control is established on the LE link (LE ACL) 302.

Next, the user, who is listening to the audio, operates the key 104 of the SNK 1 in order to stop (including pause) the audio streaming, and generates an event for instructing the stop of playback (S19). Responding to the generation of the event for instructing the stop of playback, the SNK 1 wirelessly transmits a playback stop request signal to the SRC 2 via the LE link (LE ACL) 302 (S20). The playback stop request signal is realized by a PASSTHROUGH command of AVRCP. Responding to the reception of the playback stop request signal from the SNK 1, the SRC 2 wirelessly transmits a playback stop response signal to the SNK 1 via the LE link (LE ACL) 302 (S21). Then, the SRC 2, which has accepted the playback stop request signal from the SNK 1, wirelessly transmits to the SNK 1 an A2DP disconnection request signal for disconnecting the A2DP connection on the BR/EDR link (ACL) 301 (S22). Responding to the reception of the A2DP disconnection request signal from the SRC 2, the SNK 1 wirelessly transmits an A2DP disconnection response signal to the SRC 2 (S23). Thereby, the A2DP connection on the BR/EDR link (ACL) 301 is disconnected, and the audio streaming by the A2DP is stopped (S24). In the meantime, the A2DP disconnection request signal may be wirelessly transmitted from the SNK 1.

After the audio streaming is stopped, the SRC 2 wirelessly transmits a BR/EDR link disconnection request signal to the SNK 1 in order to disconnect the BR/EDR link (ACL) 301 (S25). Responding to the reception of the BR/EDR link disconnection request signal from the SRC 2, the SNK 1 wirelessly transmits a BR/EDR link disconnection response signal to the SRC 2 (S26). Thereby, the BR/EDR link (ACL) 301 is disconnected. In the resultant state, only the LE link (LE ACL) 302, which is used for AVRCP, is present between the SNK 1 and SRC 2. In the meantime, the BR/EDR link disconnection request signal may be transmitted from the SNK 1.

Next, in order to restart the audio streaming, the user operates the key 104 of the SNK 1 and generates an event for instructing the start of playback (S27). Then, the SNK 1 wirelessly transmits a playback start request signal to the SRC 2 via the LE link (LE ACL) 302 (S28). The playback start request signal is realized by a PASSTHROUGH command of AVRCP. Responding to the reception of the playback start request signal from the SNK 1, the SRC 2 wirelessly transmits a playback start response signal to the SNK 1 via the LE link (LE ACL) 302 (S29). Subsequently, the SRC 2, which has accepted the playback start request signal, wirelessly transmits a BR/EDR link connection request signal to the SNK 1 (S30). Responding to the reception of the BR/EDR link connection request signal from the SRC 2, the SNK 1 wirelessly transmits a BR/EDR link connection response signal to the SRC 2 (S31). Thereby, a BR/EDR link 301 is established once again between the BR/EDR module 102 of the SNK 1 and the BR/EDR module 202 of the SRC 2. In the meantime, the SNK 1 may wirelessly transmit the BR/EDR link connection request signal to the SRC 2.

Then, the SRC 2 wirelessly transmits to the SNK 1 an A2DP connection request signal for setting an A2DP connection on the BR/EDR link 301 (S32). Responding to the reception of the A2DP connection request signal from the SRC 2, the SNK 1 wirelessly transmits an A2DP connection response signal to the SRC 2 (S33). Thereby, a streaming connection for executing transmission and reception of audio streaming data, that is, an A2DP connection, is established on the BR/EDR link 301, and the streaming and playback of audio data, for instance, music, are resumed (S34). The SRC 2 wirelessly transmits a stream of audio data via the BR/EDR link 301. While receiving the stream of audio data from the SRC 2 via the BR/EDR link 301, the SNK 1 decodes and plays back the received stream of audio data.

In the above-described sequence, the case in which the process for disconnecting the BR/EDR link 301 immediately after the stop of the audio streaming (S24) has been described by way of example. Alternatively, taking into account a case in which a playback request is generated once again immediately after the stop of the audio streaming, it is possible to execute the process for disconnecting the BR/EDR link 301 if it is determined that the audio streaming is stopped for a predetermined time or more.

In the above-described sequence, no mention is made of the procedure of an initial registration process, such as pairing, which is necessary when Bluetooth® devices are first connected. However, a general method, which is realized in Bluetooth® may be used for the initial registration process. Besides, a device, from which processes of connection and disconnection are started, is not necessarily limited to the device described in the embodiment, and the processes of connection and disconnection may be started from either of the devices.

Figure 4:
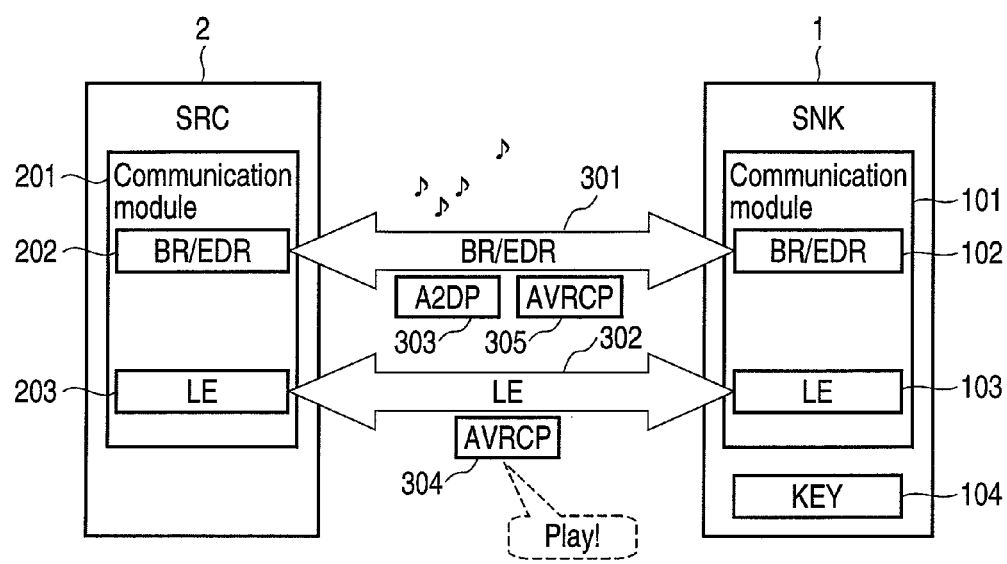
FIG. 4 is an exemplary block diagram illustrating another example of the wireless connection between the electronic device according of the embodiment and the external device.

Next, referring to FIG. 4, a description is given of another structure example of the wireless connection between the SNK 1 and SRC 2. In the structure of FIG. 4, an AVRCP connection 305 which is set up on the BR/EDR link 301 between the BR/EDR modules 102 and 202 can be used for remote control. For example, the AVRCP connection 305 on the BR/EDR link 301 is used for remote control during the audio streaming.

When the audio streaming is stopped, an LE link 302 is newly established between the LE modules 103 and 203, instead of the disconnection of the BR/EDR link 301, and remote control is executed via the AVRCP connection 304 on the LE link 302.

The outline of the communication process executed by the SNK 1 and SRC 2 is as follows.

The SNK 1 establishes a BR/EDR link 301 between the communication module 101 and the SRC 2, and digital content data is transferred between the SNK 1 and SRC 2 via the BR/EDR link 301. In addition, where necessary, the SNK 1 transmits a remote-control signal to the SRC 2 via the BR/EDR link 301. When the transfer of digital content data is stopped by the remote-control signal (playback stop request signal), the SNK 1 disconnects the BR/EDR link 301 and establishes the LE link 302 between the communication module 101 and the SRC 2.

If a playback start event for starting playback of digital content data is generated in the state in which the transfer of digital content data is stopped, that is, in the state in which the BR/EDR link 301 is disconnected, the SNK 1 transmits a playback request signal to the SRC 2 via the LE link 302, and disconnects the LE link 302. Then, in order to resume the transfer of digital audio data, the SNK 1 re-establishes the BR/EDR link 301 between the communication module 101 and the SRC 2.

Next, referring to FIG. 5 and FIG. 6, the example of the procedure of the communication process corresponding to the structure of FIG. 4 is described in greater detail. FIG. 5 and FIG. 6 illustrate a sequence in the case where audio streaming is started, the audio streaming is stopped while the audio streaming is being executed, and then the audio streaming is resumed.

To start with, the SRC 2 wirelessly transmits a BR/EDR link connection request signal to the SNK 1 (S100). Responding to the reception of the BR/EDR link connection request signal from the SRC 2, the SNK 1 wirelessly transmits a BR/EDR link connection response signal to the SRC 2 (S101). Thereby, a BR/EDR link (ACL) 301 is established between the BR/EDR module 102 of the SNK 1 and the BR/EDR module 202 of the SRC 2. In the meantime, the SNK 1 may wirelessly transmit the BR/EDR link connection request signal to the SRC 2.

Subsequently, the SRC 2 wirelessly transmits to the SNK 1 an A2DP connection request signal for setting an A2DP connection on the BR/EDR link (ACL) 301 (S102). Responding to the reception of the A2DP connection request signal from the SRC 2, the SNK 1 wirelessly transmits an A2DP connection response signal to the SRC 2 (S103). Thereby, a streaming connection for executing transmission and reception of audio streaming data, that is, an A2DP connection, is established on the BR/EDR link (ACL) 301, and the streaming and playback of audio data, for instance, music, are started (S104).

Thereafter, the SNK 1 wirelessly transmits to the SRC 2 an AVRCP connection request signal for setting an AVRCP connection on the BR/EDR link (ACL) 301 (S105). Responding to the reception of the AVRCP connection request signal from the SNK 1, the SRC 2 wirelessly transmits an AVRCP connection response signal to the SNK 1 (S106). Thereby, an AVRCP connection for executing transmission/reception of a command/response for audio remote control is established on the BR/EDR link (ACL) 301. A command for audio remote control is wirelessly transmitted from the SNK 1 to the SRC 2 via the BR/EDR link (ACL) 301.

Next, the user, who is listening to the audio, operates the key 104 of the SNK 1 in order to stop (including pause) the audio streaming, and generates an event for instructing the stop of playback (S107). Responding to the generation of the event for instructing the stop of playback, the SNK 1 wirelessly transmits a playback stop request signal to the SRC 2 via the BR/EDR link (ACL) 301 (S108). Responding to the reception of the playback stop request signal from the SNK 1, the SRC 2 wirelessly transmits a playback stop response signal to the SNK 1 via the BR/EDR link (ACL) 301 (S109). Then, the SRC 2, which has accepted the playback stop request signal from the SNK 1, wirelessly transmits to the SNK 1 an A2DP disconnection request signal for disconnecting the A2DP connection on the BR/EDR link (ACL) 301 (S110). Responding to the reception of the A2DP disconnection request signal from the SRC 2, the SNK 1 wirelessly transmits an A2DP disconnection response signal to the SRC 2 (S111). Thereby, the A2DP connection on the BR/EDR link (ACL) 301 is disconnected, and the audio streaming by the A2DP is stopped (S112). In the meantime, the A2DP disconnection request signal may be wirelessly transmitted from the SNK 1.

Next, the SNK 1 switches the AVRCP connection, which is to be used for remote control, from the AVRCP connection (AVRCP connection 305 in FIG. 4) on the BR/EDR link (ACL) 301 to the AVRCP connection (AVRCP connection 304 in FIG. 4) on the LE link 302. This switching is executed, for example, according to the following procedure.

The SNK 1 wirelessly transmits to the SRC 2 an AVRCP disconnection request signal which requests disconnection of the AVRCP connection 305 on the BR/EDR link (ACL) 301 (S113). Responding to the reception of the AVRCP disconnection request signal from the SNK 1, the SRC 2 wirelessly transmits an AVRCP disconnection response signal to the SNK 1 (S114). Thereby, the AVRCP connection 305 on the BR/EDR link (ACL) 301 is disconnected. Then, the SRC 2 wirelessly transmits a BR/EDR link disconnection request signal to the SNK 1 (S115). Responding to the reception of the BR/EDR link disconnection request signal from the SRC 2, the SNK 1 wirelessly transmits a BR/EDR link disconnection response signal to the SRC 2 (S116). Thereby, the BR/EDR link (ACL) 301 is disconnected. In the meantime, the SNK 1 may transmit the BR/EDR link disconnection request signal to the SRC 2.

Subsequently, the SRC 2 wirelessly transmits an LE link connection request signal to the SNK 1 (S117). Responding to the reception of the LE link connection request signal from the SRC 2, the SNK 1 wirelessly transmits an LE link connection response signal to the SRC 2 (S118). Thereby, an LE link 302 is established between the LE module 103 of the SNK 1 and the LE module 203 of the SRC 2. In the meantime, the SNK 1 may wirelessly transmit the LE link connection request signal to the SRC 2.

Thereafter, the SNK 1 wirelessly transmits to the SRC 2 an AVRCP connection request signal for setting an AVRCP connection on the LE link (LE ACL) 302 (S119). Responding to the reception of the AVRCP connection request signal from the SNK 1, the SRC 2 wirelessly transmits an AVRCP connection response signal to the SNK 1 (S120). Thereby, an AVRCP connection 304 is established on the LE link (LE ACL) 302.

In this manner, the AVRCP connection is switched from the AVRCP connection 305 on the BR/EDR link (ACL) 301 to the AVRCP connection 304 on the LE link 302. In the resultant state, only the LE link (LE ACL) 302, which is used for AVRCP, is present between the SNK 1 and SRC 2.

Next, in order to restart the audio streaming, the user operates the key 104 of the SNK 1 and generates an event for instructing the start of playback (S121 in FIG. 6). Responding to the generation of the event for instructing the start of playback, the SNK 1 wirelessly transmits a playback start request signal to the SRC 2 via the LE link (LE ACL) 302 (S122). Responding to the reception of the playback start request signal from the SNK 1, the SRC 2 wirelessly transmits a playback start response signal to the SNK 1 via the LE link (LE ACL) 302 (S123). Subsequently, the SRC 2, which has accepted the playback start request signal, wirelessly transmits a BR/EDR link connection request signal to the SNK 1 (S124). Responding to the reception of the BR/EDR link connection request signal from the SRC 2, the SNK 1 wirelessly transmits a BR/EDR link connection response signal to the SRC 2 (S125). Thereby, a BR/EDR link 301 is established once again between the BR/EDR module 102 of the SNK 1 and the BR/EDR module 202 of the SRC 2. In the meantime, the SNK 1 may wirelessly transmit the BR/EDR link connection request signal to the SRC 2.

Then, the SRC 2 wirelessly transmits to the SNK 1 an A2DP connection request signal for setting an A2DP connection on the BR/EDR link 301 (S126). Responding to the reception of the A2DP connection request signal from the SRC 2, the SNK 1 wirelessly transmits an A2DP connection response signal to the SRC 2 (S127). Thereby, a streaming connection for executing transmission and reception of audio streaming data, that is, an A2DP connection, is established on the BR/EDR link (ACL) 301, and the streaming and playback of audio data, for instance, music, are resumed (S128).

Thereafter, the SNK 1 wirelessly transmits to the SRC 2 an AVRCP connection request signal for setting an AVRCP connection on the BR/EDR link (ACL) 301 (S129). Responding to the reception of the AVRCP connection request signal from the SNK 1, the SRC 2 wirelessly transmits an AVRCP connection response signal to the SNK 1 (S130). Thereby, an AVRCP connection 305 is established on the BR/EDR link (ACL) 301.

Next, the SRC 2 wirelessly transmits an LE link disconnection request signal to the SNK 1 (S131). Responding to the reception of the LE link disconnection request signal from the SRC 2, the SNK 1 wirelessly transmits an LE link disconnection response signal to the SRC 2 (S132). Thereby, the LE link (LE ACL) 302 between the LE module 103 and LE module 203 is disconnected. In the meantime, the SNK 1 may wirelessly transmit the LE link disconnection request signal to the SRC 2.

As has been described above, in the present embodiment, responding to the stop of the streaming, the BR/EDR link (ACL) 301 is disconnected, and the AVRCP connection is switched from the AVRCP connection 305 on the BR/EDR link (ACL) 301 to the AVRCP connection 304 on the LE link 302. Hence, the standby power consumption during the period in which the streaming is stopped can be reduced. In addition, since the physical link, which is used during the streaming, is only the BR/EDR link (ACL) 301, the power consumption during the streaming can also be reduced.

In this embodiment, the process for disconnecting the AVRCP is executed immediately after the stop of the audio streaming (S112). Alternatively, taking into account a case in which a playback request is generated once again immediately after the stop of the audio streaming, it is possible to execute the process for disconnecting the AVRCP if it is determined that the audio streaming is stopped for a predetermined time or more. Besides, a device, from which processes of connection and disconnection are started, is not necessarily limited to the device described in the embodiment, and the processes of connection and disconnection may be started from either of the devices.

As has been described above, in the present embodiment, the BR/EDR link 301 for streaming digital content data is established by the transmission of the playback request signal via the LE link 302. Accordingly, for example, while the playback of digital content data is stopped, the BR/EDR link 301 may be disconnected, and the transfer of digital content data can easily be started (resumed) by remote control. Therefore, the power consumption for wireless communication can be reduced, without degrading the operability.

In the embodiment, the example in which Bluetooth® is used has been described. However, use may be made of other various wireless communication systems which can use two physical links. Besides, in the embodiment, the example has been described in which the LE (Low Energy) of Bluetooth® is used as the wireless communication system for executing the audio remote control. However, other wireless communication systems, such as ZigBee and RF4CE, may be used for the audio remote control.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a communication module configured to wirelessly transmit and receive signals via at least one of a first physical link and a second physical link, wherein power consumption for wireless transmission and reception of signals via the first physical link is lower than power consumption for wireless transmission and reception of signals via the second physical link;
    a first control module configured to establish the second physical link between the communication module and an external device, to transfer digital content data between the communication module and the external device via the second physical link, and to transmit a remote control signal to the external device via the second physical link;
    a link control module configured to disconnect the second physical link and to establish the first physical link between the communication module and the external device, when the transfer of the digital content data is stopped in response to the remote control signal; and
    a second control module configured to transmit a playback request signal to the external device via the first physical link, to disconnect the first physical link, and to re-establish the second physical link between the communication module and the remote device in order to resume the transfer of the digital content data, when a playback start event for starting playback of the digital content data is generated in a state in which the second physical link is disconnected.

2. The electronic device of claim 1, wherein the wireless transmission and reception of the signals via the second physical link are executed by frequency hopping, which effects hopping between a plurality of first frequency channels which are obtained by dividing a frequency band, and
    the wireless transmission and reception of the signals via the first physical link are executed by frequency hopping, which effects hopping between a plurality of second frequency channels which are obtained by dividing the frequency band and are less in number than the first frequency channels.

* * * * *